Figure 1:
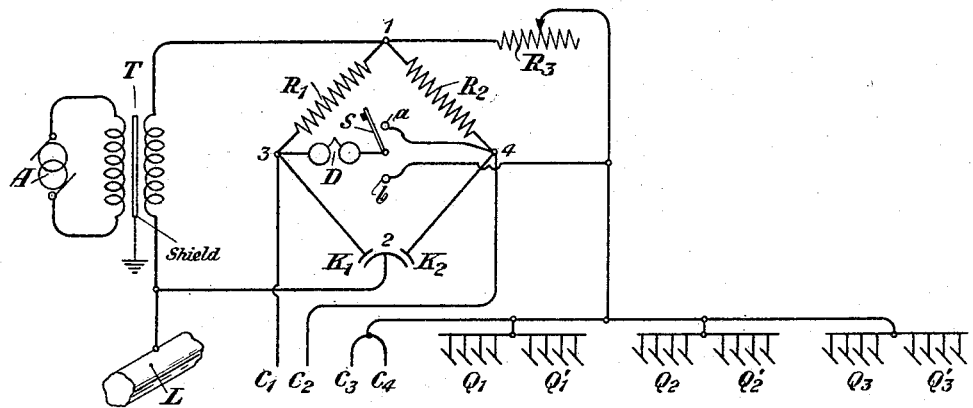

Patented Sept. 29, 1931

1,824,829

UNITED STATES PATENT OFFICE

RALPH G. McCURDY, OF ENGLEWOOD, NEW JERSEY, ASSIGNOR TO AMERICAN TELEPHONE AND TELEGRAPH COMPANY, A CORPORATION OF NEW YORK

CABLE TESTING SYSTEM

Application filed December 10, 1929. Serial No. 413,132.

This invention relates to cable testing systems. This application describes an improved method of determining the degree of unbalance of conductors of a telephone cable, or the like.

It has been learned that disturbances in the circuits of a telephone cable are frequently due to the action of induction on unbalances between the conductors of the cable and other conductive surfaces, which causes the voltage to the sheath of the cable, or to earth, of the two sides of a particular circuit to be different. In the ordinary cable the unbalance of any working circuit is almost purely capacitance. It follows, therefore, that the important unbalances which may be associated with any pair of conductors in a cable are dependent upon the capacity between the conductors and associated conductive paths. That is to say, the capacity unbalance may be considered as that between the pair of particular conductors and the surrounding cable sheath, and/or between the pair of conductors and the neighboring conductors of the cable. It is now apparent therefore, that any reduction in the magnitude of these capacity unbalances will give an almost corresponding decrease in the susceptiveness of the cable circuits to induction from power circuits.

Efforts have been made in the past to reduce the capacity unbalances contributing to noise by measuring in adjacent cable sections the so-called "capacity unbalance to ground" and splicing adjacent lengths of the cable in such a way as to minimize this capacity unbalance. This proces has required a compromise with the splicing procedure intended to minimize unbalances contributing to cross-talk, or else the making of additional testing splices for diminishing such "capacity unbalance to ground" as contributes to noise.

This so-called "capacity unbalance to ground" may be determined by measuring the capacity unbalance of a particular pair or quad of the cable with respect to the sheath while all of the other conductors of the cable are in a floating condition. Since the floating pairs or quads practically assume sheath potential this determination is the equivalent of the measurement of the sum of all of the direct capacity unbalances of the particular pair or quad under test with respect to the sheath and to all of the other wires. This determination correctly represents the capacity unbalance contributing to noise when only a single pair or quad of the cable is connected to a branch cable or to an open-wire extension which is involved in exposure to a power circuit or the like. However, this is a case not frequently encountered in the field and is therefore of little practical importance.

In the usual cabling case either the whole cable is exposed directly to power induction, or a considerable number of pairs of the cable are connected to an exposed branch cable or to an exposed open-wire extension. In either case there will be a substantial number of pairs or quads all at about the same potential with reference to the sheath and to the remaining pairs or quads. The direct capacity unbalances among the various pairs or quads which are at the same potential, do not, however, contribute to noise.

In order that the splicing of a cable may be carried out in such a way as to reduce the unbalances contributing to noise, it is necessary that the test procedure shall correctly represent the distribution of potential which arises from the conditions of exposure against which protection is desired. It will be apparent that two cases are of interest. First, the one which arises when the entire cable is of itself involved in inductive exposure. Second, that which consists in connection with the so-called toll entrance cables when a connected open-wire or a cable branch is involved in exposure.

In the first case experience indicates that the pairs or quads connected to equipment located at the same places and included in the same splicing groups, all tend to assume the same potential when the cable is so exposed. The potential difference between the various segregated groups or layers of the cable, and between these groups or layers and the sheath, are large as compared to the potential differences within a given group or layer. Reduction of the capacity unbalances contributing to noise may therefore be accomplished by splicing the adjacent sections of the cable in such a way as to minimize the direct capacity unbalances from the individual quads to the sheath and from these quads to the wires of each adjoining individual group or layer taken as a whole.

Figure 2:
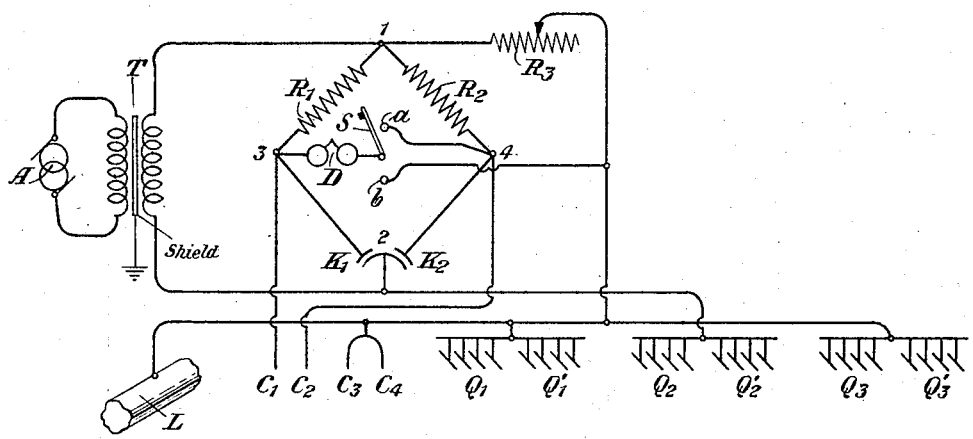

This invention will be better understood from the detailed description hereinafter following, when read in connection with the accompanying drawings in which Figure 1 shows apparatus for the measurement of the direct capacity unbalance of a pair of conductors with respect to the sheath of the cable, and Fig. 2 shows apparatus for the measurement of the direct capacity unbalances of a pair of conductors with respect to another group or layer of quads.

In Fig. 1 of the drawings the reference characters $R_1$ and $R_2$, $K_1$ and $K_2$, represent the arms of a Wheatstone bridge used for the measurement of capacity. The arms $R_1$ and $R_2$ usually have equal resistances, and the arms $K_1$ and $K_2$ may have variable condensers each of which may be adjusted in its capacitance to any desired extent.

A generator A supplies alternating current of any frequency through a shielded transformer T to the terminals 1 and 2 representing one diagonal of the bridge. An indicating instrument or detector such as a telephone receiver, is designated D and a single-pole double-throw switch is designated S. The terminals of the switch, which may be closed by its manipulation, are designated $a$ and $b$. The indicating instrument D may be connected between the terminals 3 and 4 of the bridge as a diagonal of the bridge, when the switch S is thrown so as to close the contact $a$.

The arrangement of Fig. 1 provides means to determine the capacity unbalance between two conductors $C_1$ and $C_2$ of a particular quad of the cable and the sheath of the cable designated L. The conductors $C_1$ and $C_2$ are connected to the terminals 3 and 4 of the bridge as shown. The remaining conductors $C_3$ and $C_4$ of the same quad, frequently known as "the mate", as well as the conductors of other quads $Q_1$ and $Q'_1$ which are in the same layer as the one including the conductors $C_1$, $C_2$, $C_3$ and $C_4$, and the conductors of the quads of other layers designated $Q_2$ and $Q'_2$, and $Q_3$ and $Q'_3$, are all connected to the terminal 1 of the bridge through an element of variable resistance designated $R_3$. The cable sheath L is connected to the terminal 2 of the bridge and may be considered as grounded.

In the arrangement shown in Fig. 1 of the drawings, all of the resistance of the element $R_3$ may be cut out and the switch S then thrown so as to close its associated contact $b$. If a sound is heard at the detecting device D it will indicate that the conductor $C_1$ is at a different potential from the conductors $C_3$ and $C_4$ and the conductors of the quads $Q_1$ and $Q'_1$, $Q_2$ and $Q'_2$, and $Q_3$ and $Q'_3$. This difference of potential is ordinarily brought about by the interposition of the resistance of the arm $R_1$ in the bridge. In order to keep the conductors $C_3$ and $C_4$ and the conductors of the quads $Q_1$ and $Q'_1$, $Q_2$ and $Q'_2$, and $Q_3$ and $Q'_3$ at the same potential as each of the conductors $C_1$ and $C_2$, the variable arm of the element $R_3$ may be adjusted until no sound is heard in the detecting device D. By including resistance at $R_3$, it is possible to maintain each conductor $C_1$ and $C_2$ of the pair under test, at the same potential as the other conductors $C_3$ and $C_4$ of the same quad, and the conductors of the remaining quads which are connected to the conductors $C_3$ and $C_4$.

The switch S may then be thrown so as to close its associated contact $a$. The condensers $K_1$ and $K_2$ may then be adjusted in their capacitance values until the bridge becomes balanced, and the balanced condition will be indicated by the absence of any sound at the indicating device D. If the condensers $K_1$ and $K_2$ include calibrated scales to indicate their capacitance values, then these scales will indicate the unbalance of the conductors $C_1$ and $C_2$ with respect to the sheath of the cable L, while the remaining conductors $C_3$ and $C_4$ of the same quad and the conductors of the quads $Q_1$ and $Q'_1$, $Q_2$ and $Q'_2$, and $Q_3$ and $Q'_3$ are maintained at the same potential as the conductors $C_1$ and $C_2$ under test.

Fig. 2 of the drawings shows an arrangement somewhat similar to the one shown in Fig. 1, in which the apparatus is used for the measurement of the capacity unbalance between two of the conductors designated $C_1$ and $C_2$ with respect to the conductors of the quads of another group or layer, two of which are shown and designated $Q_2$ and $Q'_2$, both of which may be at a different potential with respect to the pair or quad under test. In this case the sheath L, the conductors of the same quad $C_3$ and $C_4$, the conductors of other quads $Q_1$ and $Q'_1$ in the same layer as those of the quad under test, and the conductors of the quads $Q_3$ and $Q'_3$ of still other layers, are all connected to the variable arm of the element $R_3$. The testing procedure is the same as already outlined and need not be repeated.

It will be apparent that the bridge arrangement shown in the drawings may be employed for the case of the so-called toll entrance cable which is connected to an exposed open-wire. Experience here indicates that the pairs of the cable not connected to the open-wire will be practically at the potential of the sheath, and that the pairs which are connected to the exposed open-wire will be nearly all at the same potential which is different from that of the sheath. The testing procedure then consists in connecting all of the pairs or quads terminating in the open-wire to the bridge, that is, to $R_3$, so that these will be at the potential of the pair or quad, the capacity unbalance of which is being tested. The other pairs or quads not connected to the open-wire may be connected to the terminal 2. The testing procedure will then determine the direct capacity unbalance with respect to the conductors connected to terminal 2.

While this invention has been shown in certain particular arrangements merely for the purpose of illustration, it will be understood that the principles of this invention may be applied to other and widely varied organizations without departing from the spirit of the invention and the scope of the appended claims.

What is claimed is:

1. The method of determining the degree of unbalance in a telephone cable which consists in measuring the capacity unbalance between two of the conductors of the cable and its sheath and maintaining all of the other conductors of the cable substantially at the same potential as said two conductors.

2. The method of determining the unbalance between certain conductive parts of a telephone cable with respect to other conductive parts of the cable which consists in measuring the capacity unbalances between the first conductive parts with respect to the second conductive parts and maintaining the remaining conductive parts of the cable at the same potential as the first conductive parts of the cable.

3. A testing system for a telephone cable including a Wheatstone bridge adaptable for capacity measurement, two conductors of the cable connected respectively to the two terminals representing one diagonal of the bridge, a detecting device connected to the same two terminals of the bridge, and a source of alternating current connected to the other two terminals representing the other diagonal of the bridge, the remaining conductors of the cable being connected to one of said other terminals, the sheath of the cable being connected to the other of said other terminals.

4. A testing system for a cable comprising a Wheatstone bridge having two variable condensive elements as two of the arms of the bridge, two of the conductors of the cable being connected respectively to two of the terminals of the bridge respresenting one diagonal, a detecting device connected to the same two terminals of the bridge, a source of alternating current connected to the other two terminals representing the other diagonal of the bridge, and a variable resistance connecting the remaining conductors of the cable to one of the latter terminals of the bridge, the sheath of the cable being connected to the other of the latter terminals of the bridge.

5. The method of determining the degree of unbalance in a telephone cable, which consists in measuring the capacity unbalance between any two of the conductors in any one of the layers of the cable and any group of other conductors within any other layer, and maintaining all the remaining conductors and the sheath of the cable at the same potential as said two conductors.

In testimony whereof, I have signed my name to this specification this 9th day of December, 1929.

RALPH G. McCURDY.